Figure 1:
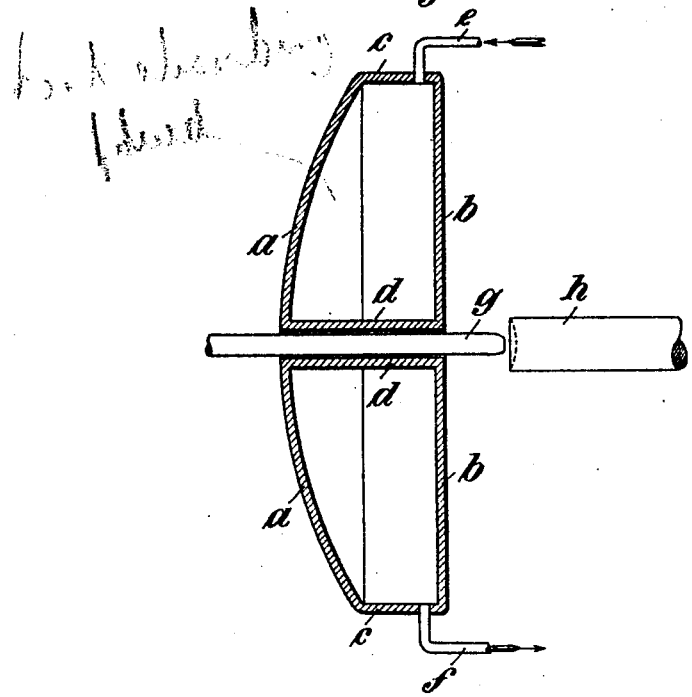

Jan. 29, 1924.

A. MIETHE

REFLECTOR

Filed May 12, 1923

Inventor:
Adolf Miethe

Patented Jan. 29, 1924.

1,482,313

UNITED STATES PATENT OFFICE.

ADOLF MIETHE, OF CHARLOTTENBURG, NEAR BERLIN, GERMANY.

REFLECTOR.

Application filed May 12, 1923. Serial No. 638,471.

*To all whom it may concern:*

Be it known that I, ADOLF MIETHE, a doctor of philosophy, university professor, a citizen of the German Republic, residing at Charlottenburg, near Berlin, Germany, have invented certain new and useful Improvements in Reflectors, of which the following is a specification.

This invention relates to reflectors of the mirror type. When such reflectors work with strong sources of light, it may happen that the mirror becomes excessively heated by the action of the rays from the source of heat, so that either the silvering suffers or the glass cracks or becomes deformed so as to render it useless for some purposes. It is furthermore frequently desired to eliminate from the converging or parallel bundle of rays issuing from the reflector the long waved heat rays, particularly when the mirror reflector is employed for projecting purposes. It has already been proposed to render the heating effect of strong sources of light harmless for projecting purposes by inserting between the source of light and the projecting object-glass a liquid cooling screen. Such a screen was capable of ameliorating the harmful effect of the rays issuing from the reflector, but could not protect the mirror. Furthermore the loss of light caused by reflection at both the outer faces of the screen made itself strongly noticeable in this known arrangement.

According to my invention the heat-absorbing liquid screen is so intercalated between the source of light and the mirror, that it is twice traversed by the rays from the source of light. In this manner an effective cooling of the collecting mirror is attained and the long-waved invisible rays which have only a disturbing action and are quite useless for the reflection effect are eliminated from the rays reflected by the mirror. A further advantage is that the thickness of the screen can be made less than that of the hitherto employed screens, inasmuch as it is traversed twice by the useful rays.

Instead of simply disposing the screen between the source of light and the mirror, the reflecting surface may also be brought into optical contact with the screen, whereby the losses of light connected with the employment of liquid screens are considerably diminished.

In embodying this further development of the invention the concave mirror of the reflector can be made the rear wall of a water-tight compartment, the front wall of which is formed by a transparent glass pane perpendicular to the axis of the mirror. The rays emanating from the lamp and falling on the mirror then traverse the liquid of the screen before they fall on the mirror, are reflected by the rear wall, again traverse the liquid and the front wall of the screen and lose on their path a greater or smaller portion of their harmful heat rays, according to the nature and the thickness of the liquid in the screen.

Furthermore the front wall of the screen, whether the screen is directly connected with the mirror or not, may, in the manner of a Mangin mirror or the like, be so shaped that it reduces the spherical deviations of the reflecting surface of spherical shape or annuls if for a definitive aperture proportion, so that the screen produces in the manner of a lens mirror either less scattering of the parallel bundle or a point image of the source of light or a definitive indistinctness of the image of the source of light, as it appears desirable in the employment of the apparatus.

As in the case of strong sources of light the liquid in the screen may become inconveniently heated, when the device is kept at work for a considerable time, provisions may be made for circulating the liquid in the screen and instead of pure water, watery solutions which absorb heat better and are as far as possible without color may be employed, as for instance a $\frac{1}{2}\%$ copper-iron sulphate solution.

Even if the screen is not formed so that the mirror forms its optical rear wall, or in other words even if it is confined by two plane glass surfaces only, the above enumerated advantages are at least, partly attained, while the principle of the invention, the intercalation of the screen between the lamp and mirror, is still preserved.

The object of the invention is furthermore to produce a reflector which is particularly adapted to the requirements of kinematographic projection and which at the same time represents a further development of the hereinbefore described reflector with cooling screen. For the purpose of kinematographic projection the system of mirrors is given the action of an ellipsoidal concave mirror in the optical sense in order to distinctly reproduce the bundle of rays emanating from the lamp at a point in finite distance. With this end in view a concave mirror of paraboloidal shape is combined with a spherically curved transparent body, which has the general shape of a collecting lens.

In the industry grinding and polishing machines are known by means of which reflector mirrors of paraboloidal shape may be produced. These machines do, however, not allow the production of ellipsoidal mirrors without special provisions and their manufacture would become too expensive in view of the comparatively limited demand for such mirrors. This invention brings the further advantage in its train that the mirrors produced on the available machines, the easily and cheaply obtainable mirrors of paraboloidal shape may also be employed for kinematographic projection apparatus, by converting them into an ellipsoidal mirror in regard to their action by combining them with a glass body or the like in the shape of a collecting lens. Such a glass body is, however, not suitable for all purposes, more particularly not when it is necessary to absorb heat rays emanating from the source of light.

When discussing above the cooling screen the possibility has already been mentioned that the front surface of a reflecting cooling screen may be so chosen, that the path of the rays is thereby changed in a desired manner. A particularly valuable application of this idea results, if the cooling vessel, which may at the rear be directly confined by the mirror, is given such a shape, that the vessel receives the shape of a positive lens. In this manner the effect of an accurately ellipsoidal mirror may be attained by means of a paraboloidal mirror.

The curvature value of the spherical front wall of the cooling screen must be chosen according to the refraction factor of the cooling liquid in the screen and the eccentricity of the optical mirror ellipsoid required for the apparatus, so that even for large apertures in first approximation, that is to say without considering the paraboloidal intermediate faults, the bundle of rays emanating from the mirror combines to a distinct image of the source of light in a second focus, the position of which can be chosen as desired.

In the drawing is:—

Figure 2:
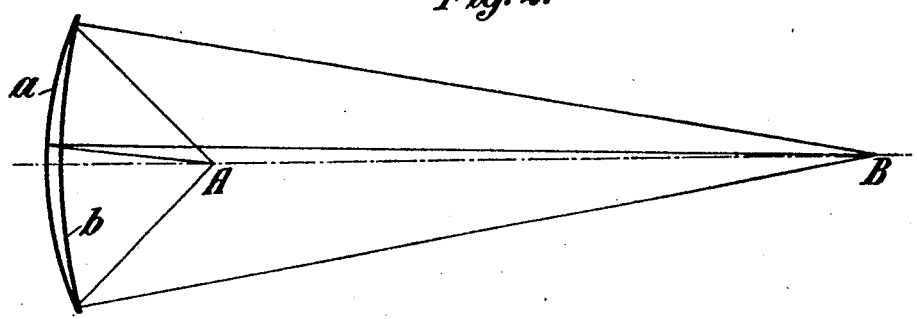

Fig. 1 a diagrammatic representation of a reflector or searchlight arc lamp with which a liquid screen is combined, the construction and arrangement of which is shown by way of example only, and Fig. 2 a diagrammatic representation of the combination of a paraboloidal concave mirror with a spherically curved transparent body, which has the general shape of a collecting lens, the whole forming a cooling mirror, also illustrated by way of example.

Similar parts are indicated by the same letters of reference in both figures of the drawing.

Referring to Fig. 1, $a$ is the concave mirror, which at the same time forms the rear wall of the liquid screen. The glass front face $b$ of the screen, which may be plane-parallel, watch-crystal-like, shell-like, or otherwise suitably dome-shaped is joined by the annular body $c$ with the mirror $a$ in any watertight manner. As in the construction of a reflector or searchlight arc lamp illustrated the carbons $g$, $h$ are disposed in the axis of the mirror and the negative carbon is carried through the mirror, a duct $d$ is built watertight into the screen for the passage of this carbon. Pipe branches $e$ and $f$ serve as inlet and outlet for the cooling liquid.

Should the carbons be differently arranged or should another than an electric source of light be employed, which would of course fall within the ambit of my claims, the duct $d$ and the penetration of the mirror would obviously be unnecesary or could be employed for the reception or guidance of parts of other lamps.

Referring to Fig. 2 $b$ is a spherical surface nearest to the source of light A and is refracting in its effect. The other surface $a$ is paraboloidal and acts reflecting. The space between the surfaces $a$ and $b$ has the shape of a collecting lens and is preferably filled with a strongly heat absorbing liquid, in order to rob the rays emanating from the source of light at the same time of their heating action. A luminous point situated at A is by the catadioptric system reproduced at B free from aberrations. Owing to the aberrations—free reproduction this optical system, which consists of a refracting purely spherical surface and a reflecting paraboloidal surface, has the properties of a single reflecting ellipsoidal surface.

It will be understood that the principal underlying my invention may be carried into practice in many ways, which will easily suggest themselves, without departing from the spirit of the invention or sacrificing any of its advantages. What I claim as my invention and desire to secure by Letters Patent is:—

1. In combination with a reflector and a source of light lying in the axis of said reflector, a heat-absorbing liquid screen interposed between said reflector and said source.

2. In combination with a concave mirror and a source of light lying in the axis of said mirror, a heat-absorbing liquid screen interposed between said source and said mirror.

3. The combination with a reflector, of a receptacle for a heat-absorbing fluid, said reflector forming one of the receptacle walls, the wall opposite said reflector being light-pervious.

4. The combination with a concave mirror, of a receptable for a heat-absorbing fluid, said mirror forming one of the receptacle walls, the receptacle wall opposite said mirror being light-pervious.

5. The combination with a concave mirror, of a receptacle for a heat-absorbing fluid, said mirror forming one of the receptacle walls, the receptacle wall opposite the mirror being light-pervious, said light-pervious wall being so shaped as to diminish the spherical aberration of said mirror.

6. The combination with a paraboloidal concave mirror of a receptacle for a heat-absorbing fluid, said mirror forming one of the receptacle walls, the receptacle wall opposite said mirror being light-pervious and spherically curved, whereby the fluid chamber is shaped as a positive lens.

In testimony whereof I affix my signature.

ADOLF MIETHE.